April 16, 1946. R. E. CROOKE 2,398,522
SPOT MECHANISM FOR GUN FIRE CONTROL
Original Filed May 11, 1937
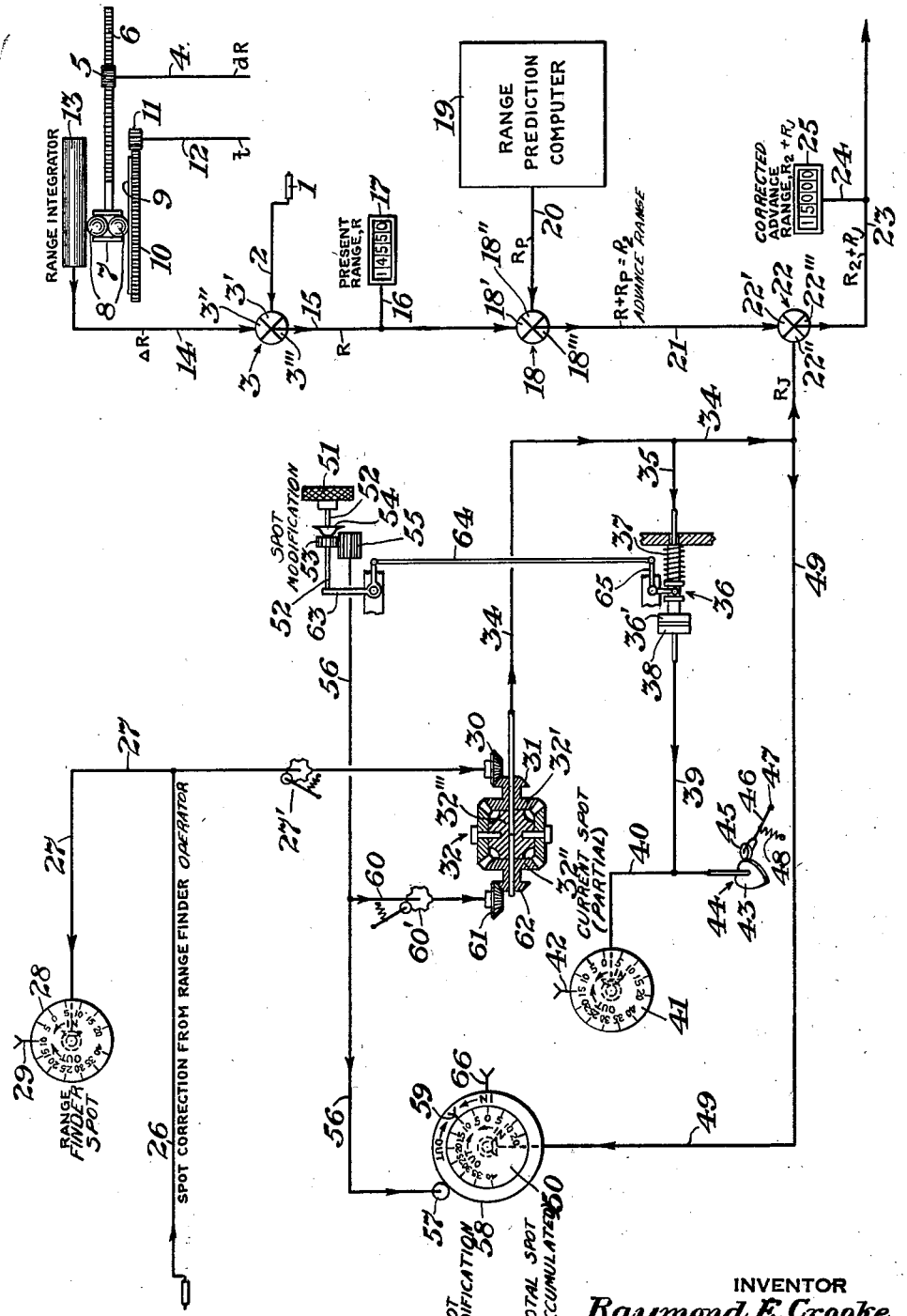
INVENTOR
Raymond E. Crooke
BY
HIS ATTORNEY Patented Apr. 16, 1946

2,398,522

UNITED STATES PATENT OFFICE 2,398,522

SPOT MECHANISM FOR GUNFIRE CONTROL

Raymond E. Crooke, Little Neck, N. Y., assignor to Ford Instrument Company, Inc., Long Island City, N. Y., a corporation of New York Application May 11, 1937, Serial No. 141,984
Renewed February 28, 1939

6 Claims. (Cl. 235—61.5)

The invention herein lies in the arrangement and correlation of a plurality of range correcting instrumentalities which enable the modification of a range from a known position to the predicted position of a target in accordance with spot corrections made in such range to improve the accuracy in the firing of guns against the target.

One object is to operate the mechanism in accordance with range spots evaluated by a range finder operator and to indicate the value of these spots at the mechanism. A further purpose is to provide means whereby an operator at the mechanism, which may be part of a range keeper, can exercise his judgment as to whether the value of the range spot received from the range finder is proper for use, and, if not, modify this value to make it so in the opinion of the range keeper operator. Provision is made not only to indicate the value of the range finder spot, but also the extent of its modification, if any, by the range keeper operator.

Indicating means are incorporated in the mechanism, one to show the algebraic sum of the accumulated spot corrections, i. e., the total spot correction, and another to disclose only the current range spot correction, which is, therefore, regarded as a partial spot in distinction to the total, or accumulated, spot correction. Means are present in the partial spot mechanism for utilization in effacing the current partial spot indication in order that a subsequent partial spot may be set up.

The invention will be more clearly comprehended from the following description in connection with the accompanying drawing which is a schematic representation of an embodiment of the invention.

The spot corrections referred to above are made in an existing advance range, $R_2$, which, for the purposes of this disclosure, may be considered to be obtained by first operating a crank 1, and, therefore, a drive 2 to actuate a side 3' of a differential 3 to introduce initial present range into that portion of a range keeper that computes the range of a target. The range keeper has (unshown) known means (see Patent No. 1,370,204, issued March 1, 1921) for calculating the rate of change of range, $dR$, in accordance with which a drive 4 and a pinion 5 are actuated. Pinion 5 displaces a rack bar 6 attached to a ball carriage 7 in which balls 8 are carried, whereby the balls are positioned radially of a rotatable disk 9 in accordance with the rate of change of range, $dR$. The driving disk 9 is rigidly mounted on one side of a gear 10, which is rotated by a pinion 11 fast on a shaft 12 proportionately to time, $t$. The balls 8 in turn rotate an output roller 13 which, therefore, is driven in correspondence with the product of the rate of change of range, $dR$, and time, $t$, or, in other words, in accordance with increments of range, $\Delta R$. Roller 13 operates a drive 14 which in turn actuates a side 3''' of differential 3.

As a result, the center 3''' of the differential is operated to always be in correspondence to the present range, R, as is a drive 15, which through an operating connection 16 actuates an indicator 17 to show the instantaneous value of the present range.

Continuing to a differential 18, the drive 15 operates a side 18' thereof in accordance with the present range, R. Suitable means of well known character (see Patent 1,472,590, issued October 30, 1923) compute the range prediction, $R_P$, such means being commonly referred to as a range prediction computer, which is here designated by the numeral 19, and shown to operate a drive 20. This drive actuates a side 18'' of differential 18, the center 18''' of which, in consequence of the above referred to inputs of present range, R, and the range prediction, $R_P$, is operable to give a measure of advance range, $R_2$. Differential center 18''', therefore, drives a shaft 21 and one side 22' of a differential 22 in correspondence to the value of the advance range, $R_2$. The center 22''' of the differential and drives 23 and 24 are likewise operated in accordance with the same value of this quantity to set an indicator 25 to show the existing value of the advance range, $R_2$.

Now, as the target is fired upon, the range finder operator may observe that the projectile either overshoots or falls short of the target, and thereupon he transmits over drive 26 a range spot correction. Drive 26 thus actuates primary spotting means including another drive 27 provided with a yieldable detent 27' to set a range finder spot dial 28, which reads against a fixed index 29 to give a reading of the value of range finder spot. The notches in detent 27' are so spaced that a shift from one notch to the next represents a predetermined number of yards, say 50 or 100. For example, if the projectile overshoots the target by, say, 500 yards, the dial 28 will be made to read 500 yards "In," indicating that the elevation of the gun is to be reduced by a number of minutes of arc which it is known will lessen the travel of the projectile 500 yards to agree with the range of the target. Conversely, if the projectile falls short of the target by 500 yards, the dial 28 will be made to read 500 yards "Out," so that, when the elevation of the gun is increased by the appropriate amount to compensate for this range deficiency, the projectile will travel a distance corresponding to the range of the target.

Drive 27 also extends in another direction to turn a bevel gear 30 that is in mesh with another bevel gear 31 that is rigidly combined with one side 32' of a differential 32. Side 32' of this differential thus actuates the center 32''' thereof, which operates drives 34 and 35 and a clutch 36. The clutch comprises a retractible clutch member 36' that is urged by a spring 37 into driving relation with a coacting clutch member 38 that operates drives 39 and 40 and a current range spot dial 41 to set the same to read against an index 42 to show the value of the range spot received from the range finder operator.

Drive 40 concomitantly turns a heart-shaped cam 43 of a resetting mechanism 44 whereby a roller follower 45 on the free end of an arm 46 that is pivoted at 47 is moved out of the notch of the heart-shaped cam proportionately to the value of the current range spot and to be in engagement with a point on its periphery that has an increased radius. A spring 48 has one of its ends anchored, its other end being attached to the arm 46 so that as the follower roller 45 is moved out of the notch of the heart-shaped cam 43 energy is stored in the spring 48, the utilization of which will be explained hereinafter.

At the same time, drive 34 operates another drive 49 and a total range spot dial 50 the function of which will be referred to later. While this is transpiring the drive 49 also actuates the side 22'' of differential 22 whereby the range spot from the range finder operator is algebraically added to the measure of the advance range, $R_2$, which is introduced into differential 22 by the actuation of its side 22', as already explained. Therefore, the hereinbefore referred to displacement of the center 22''' of the differential and drives 23 and 24 is modified by a correction value, $R_J$, so that the indicator 25 will now give a reading of the corrected advance range, $R_2+R_J$, as its value should be when corrected for the range spot received from the range finder operator. A gun properly trained and elevated by an amount that is commensurate with the corrected advance range should fire a projectile so that it will hit the target, if the range spot from the range finder operator has been correctly estimated.

The operator at the range keeper, who is senior to the range finder operator, may, however, feel that the value of the range spot received from the range finder operator is not what it should be, in view of his fuller knowledge of the existing situation. If this be the case, the range keeper operator turns a knob 51 of a secondary spotting means thereby turning a shaft 52 and a spur gear 53 mounted thereon in combination with a friction coupling 54, which permits slippage only under excessive stress due to any jamming of the mechanism. The gear 53 is in mesh with another and wider faced spur gear 55, which operates a drive 56 and a pinion 57 to set a ring dial 58, having an index 59 thereon, according to the value of the range keeper operator's modification alone of the range spot received from the range finder operator.

Concurrently with the setting of the modification indicating ring dial 58, the drive 56 operates another drive 60 provided with a yieldable detent 60' which is similar to detent 27'; a bevel gear 61, another bevel gear 62 in mesh therewith and, hence, a side 32'' of differential 32. There is, therefore, a consequent operation of the center 32''' of the differential, drives 34 and 35, clutch 36 and drives 39 and 40, thereby altering the setting of the current range spot dial 41 in accordance with the present positive or negative modification of the current range finder range spot according to whether the spot alteration is for an increase or decrease in range.

Simultaneously, the drive 34 operates drive 49, side 22'' and center 22''' of differential 22 and drives 23 and 24 to readjust the indicator 25, causing this indicator to change the reading of the corrected advance range $R_2+R_J$ in accordance with the range keeper operator's modification of the range finder spot. As the drive 49 is thus operated, it also resets the total spot dial 50 to effect the same modification with respect to its last previous spot indication.

Preparatory to the receipt of another range spot from the range finder operator, the range keeper operator pushes the knob 51 inward. This shifts the shaft 52 and gear 53 axially so that shaft 52 causes a bell crank lever 63 to turn on its fulcrum so that through a link 64 another bell crank lever 65 is turned to retract the clutch member 36' from its driving relation with the driven clutch member 38. As soon as the clutch 36 is thus declutched, the heart-shaped cam mechanism 44 is freed, and the energy stored in its spring 48 is effective to return the heart-shaped cam to its former position wherein the roller follower 45 is again seated in the notch of the cam. While this is happening the cam 43 turns the drive 40 an amount which turns the current spot dial 41 to its zero position. Dial 41 is then ready to be set again, this time in accordance with the range finder range spot next received and any modification of this spot by the range keeper operator, in the manner previously set forth.

The total range spot dial 50 is operable in accordance with the accumulation of all of the range finder range spots received and the various modifications applied thereto. Dial 50 reads against a fixed index 66 and thereby shows the existing total range spot that results from the accumulation of the previous and present range spots and whatever modifications thereof that have been made by the range keeper operator. The ring dial 58 is settable in accordance with the accumulation of the modifications of the range finder spots introduced by the range keeper operator and may be graduated relative to its index 59 to indicate the total accumulated modification when read against the fixed index 66. The index 59 of ring dial 58 is readable against the graduations of the total range spot dial 50 to give a reading that discloses the portion of the accumulated total spot that is derived from the range finder operator. This reading is the same as dial 28.

This is obvious from the fact that, when the range finder range spot is transmitted by drives 26 and 27 to set dial 28 against index 29 to show the value of the range finder range spot, drive 27 also actuates gears 30 and 31, the side 32' and center 32''' of differential 32 and drives 34 and 49 to set the total range spot dial 50 in correspondence to the setting of the range finder range spot dial 28. When the range keeper operator turns knob 51, so actuating shaft 52, gears 53 and 55, drive 56 and pinion 57 to set the ring dial 58 in accordance with a modification of the range finder range spot, drive 56 also actuates drive 60, gears 61 and 62, side 32'' and center 32''' of differential 32 and drives 34 and 49 to turn the total range spot dial 50 in unison with the modification ring dial 58. There, therefore, being no relative rotary movement between the total range spot dial 50 and the modification ring dial 58, the index 59 on the latter continues to read against the matched graduation on the total range spot dial 50 to display the same value of the range finder operator's range spot that is shown on dial 28.

The range keeper operator uses the dial 41 when observing the current spots applied by the range finder operator and when applying modifications thereto. Before starting to track a target the range finder operator sets dial 28 to zero and the range keeper operator sets dial 41 to zero by pressing in on knob 51, which operation releases clutch 36. With the knob 51 still pressed in, the operator turns the knob to bring dial 58 to zero. Dial 41 will remain at zero during this operation as the clutch 36 is still open. When dials 28 and 58 have been brought to zero, dial 50 will also come to zero. When firing commences the range finder operator observes whether the range is over or short and makes the corresponding "In" or "Out" spot. When making this spot he can tell the amount of spot applied by counting the notches passed over by detent 27'. The range keeper operator observes the amount of this spot from dial 41 and may modify it by turning knob 51 to bring the dial to the reading he thinks is correct, or he may decide the amount of modification he desires to apply and then apply that amount by counting the number of notches on detent 60' that are passed over. Regardless of the manner of determining the amount of modification that is applied, the range keeper operator should next press knob 51 to return dial 41 to its zero position in readiness for receiving the next correction or spot from the range finder operator.

As an optional method of using dial 41, the range keeper operator may, after mentally noting the amount of a spot applied by the range finder operator, press knob 51 in, thereby returning dial 41 to its zero position. The range keeper operator may then apply the modification he considers proper by turning knob 51. The movement of dial 41 will now indicate the amount of this modification. Pressing knob 51 will again release dial 41, which will turn to zero, preparatory to receipt of another spot from the range finder operator, or the range keeper operator may apply further modifications if he considers them necessary.

The invention is not to be limited to the particular arrangement of mechanism diagrammatically shown in the drawing and above particularly described, but only as required by the language of the following claims in view of the prior art.

I claim:

1. In gun-fire spotting mechanism, primary means operable according to successive spot corrections, secondary means operable according to a modification for the current spot correction, algebraic adding means responsive to said primary and secondary means, an indicator, means biasing said indicator toward a zero position, an operating connection from said adding means to said indicator for causing the same to indicate the current spot correction, interrupting means for said operating connection effective upon the actuation thereof to permit said biasing means to return said indicator to its zero position, and a second indicator permanently responsive to said adding means to indicate the total accumulated spot correction.

2. In gun-fire spotting mechanism, primary means operable according to successive spot corrections, secondary means for modifying the current spot correction including driving and driven elements capable of supplementary adjustment, a plurality of indicating means, one having a zero position, operating connections from said primary and secondary means to said plurality of indicating means, that to said one indicating means causing the same to show the current modified spot correction and including a normally clutched coupling, actuating means for use between succeeding spot corrections operable by supplementary adjustment of said elements to declutch said coupling, and biasing means thereupon effective to act only upon said one indicating means to return the same to its zero position.

3. In gun-fire spotting mechanism, primary means operable according to successive spot corrections, secondary means for modifying the current spot correction including rotary driving and driven elements combined for relative axial adjustment, a plurality of indicating means, one being operable only by said secondary means to disclose the extent of the modification of the spot correction, operating connections from said primary and secondary means to others of said indicating means, one of which is operable to disclose the total accumulated spot correction and another to disclose the current modified spot correction and having a zero position, the operating connection to the last named indicating means including a normally clutched coupling, actuating means for use between succeeding spot corrections operable by relative axial adjustment of said elements to declutch said coupling, and biasing means thereupon effective to act only upon the last named indicating means to return the same to its zero position.

4. In gun-fire spotting mechanism, two independently operable setting devices for manual operation, two indicating devices, means operatively connecting both setting devices to both indicating devices, whereby the algebraic sum of the operation of both setting devices is transmitted to both indicating devices, means for resetting one of the indicating devices to zero, a third indicating device concentrically associated with the other indicating device and directly operable by one of the setting devices to indicate the accumulated operation of the one setting device.

5. In gun-fire spotting mechanism, primary means operable according to successive spot corrections, secondary means for modifying the corrections at will, indicating means responsive to the combined accumulative operation of said primary and secondary means, a second indicating means having a zero position and being responsive to the operation of said primary and secondary means, means for returning the said second indicating means to a zero position, a third indicating means directly operable by the secondary means to indicate the accumulated modifications and concentrically associated with the first mentioned indicating means for indicating the relation of the accumulated modifications to the accumulated correction.

6. In gun-fire spotting mechanism, primary means operable according to successive spot corrections, secondary means for modifying current corrections at will, indicating means jointly responsive to said primary and secondary means to indicate the total accumulated spot correction, a second indicating means under the control of said secondary means to disclose a measure of the modification alone, a third indicating means biased to a zero position, and clutch means normally connecting said third indicating means for movement in accordance with contemporaneous actuations of said primary and secondary means to disclose the current spot correction, said clutch means being selectively actuatable by an element of said secondary means for releasing the third indicating means to permit its return to its biased zero position at will.

RAYMOND E. CROOKE.